(12) United States Patent
Mittal et al.

(10) Patent No.: US 7,734,737 B2
(45) Date of Patent: Jun. 8, 2010

(54) DEVICE MANAGEMENT WITH CONFIGURATION INFORMATION

(75) Inventors: Gaurav Mittal, Tampere (FI); Mikko Sahinoja, Tampere (FI)

(73) Assignee: Nokia Corporation, Espoo (FI)

( * ) Notice: Subject to any disclaimer, the term of this patent is extended or adjusted under 35 U.S.C. 154(b) by 1352 days.

(21) Appl. No.: 11/138,906

(22) Filed: May 26, 2005

(65) Prior Publication Data

US 2006/0271659 A1    Nov. 30, 2006

(51) Int. Cl.
G06F 15/177 (2006.01)
G06F 15/173 (2006.01)
G06F 15/16 (2006.01)
G06F 9/00 (2006.01)
H04M 3/00 (2006.01)

(52) U.S. Cl. .................. 709/220; 709/223; 709/227; 713/1; 713/100; 455/419

(58) Field of Classification Search ................. 709/223
See application file for complete search history.

(56) References Cited

U.S. PATENT DOCUMENTS

| | | | | |
|---|---|---|---|---|
| 5,734,659 A | * | 3/1998 | Mann et al. | 370/474 |
| 5,842,011 A | * | 11/1998 | Basu | 713/2 |
| 6,199,158 B1 | * | 3/2001 | Hirsch | 713/1 |
| 6,317,826 B1 | * | 11/2001 | McCall et al. | 713/1 |
| 6,389,464 B1 | * | 5/2002 | Krishnamurthy et al. | 709/220 |
| 6,519,234 B1 | * | 2/2003 | Werkander | 370/328 |
| 6,651,101 B1 | * | 11/2003 | Gai et al. | 709/224 |
| 6,760,761 B1 | * | 7/2004 | Sciacca | 709/220 |
| 6,856,591 B1 | * | 2/2005 | Ma et al. | 370/216 |
| 6,865,428 B2 | * | 3/2005 | Gonzales et al. | 700/86 |
| 6,865,596 B1 | * | 3/2005 | Barber et al. | 709/208 |
| 7,184,758 B2 | * | 2/2007 | Corneliussen et al. | 455/419 |
| 7,269,638 B2 | * | 9/2007 | Vestergaard et al. | 709/219 |
| 7,313,728 B2 | * | 12/2007 | Rhea et al. | 714/25 |
| 7,363,354 B2 | * | 4/2008 | Lahti | 709/219 |
| 2003/0005096 A1 | * | 1/2003 | Paul et al. | 709/222 |
| 2003/0027581 A1 | * | 2/2003 | Jokinen et al. | 455/456 |
| 2003/0035409 A1 | * | 2/2003 | Wang et al. | 370/349 |
| 2003/0037128 A1 | * | 2/2003 | Beadles et al. | 709/220 |

(Continued)

FOREIGN PATENT DOCUMENTS

EP    1513317    3/2005

OTHER PUBLICATIONS

Byung-Yun Lee et al., 5$^{th}$ IEEE International Conference on Data synchronization protocol in mobile computing environment using SyncML,High Speed Networks and Multimedia Communications(2002) pp. 133-137 ISBN: 0-7803-7600-5.*

(Continued)

*Primary Examiner*—Saleh Najjar
*Assistant Examiner*—Robert Shaw
(74) *Attorney, Agent, or Firm*—Alfred A. Fressola; Ware, Fressola, Van Der Sluys & Adolphson LLP

(57) ABSTRACT

The invention relates to device management and to information needed for bootstrapping and initiation. The bootstrapping information and initiation information are sent in one message, wherein the client receives them both. According to the state of the client, one of the informations is selected and used.

11 Claims, 2 Drawing Sheets

U.S. PATENT DOCUMENTS

| | | | |
|---|---|---|---|
| 2003/0101246 A1* | 5/2003 | Lahti | 709/221 |
| 2003/0191827 A1* | 10/2003 | Piispanen et al. | 709/221 |
| 2004/0083472 A1* | 4/2004 | Rao et al. | 717/171 |
| 2004/0109454 A1* | 6/2004 | Sahinoja et al. | 370/395.5 |
| 2005/0055453 A1* | 3/2005 | Zhu | 709/230 |
| 2005/0058061 A1* | 3/2005 | Shaffer et al. | 370/216 |
| 2005/0078600 A1* | 4/2005 | Rusmisel et al. | 370/217 |
| 2005/0080921 A1* | 4/2005 | Lu | 709/237 |
| 2005/0234967 A1* | 10/2005 | Draluk et al. | 707/102 |
| 2005/0235046 A1* | 10/2005 | Carpenter | 709/219 |
| 2006/0101495 A1* | 5/2006 | Yoshida et al. | 725/78 |

OTHER PUBLICATIONS

Hansman et al, SyncML®: Synchronizing and Managing Your Mobile Data, Prentice Hall, Sep. 19, 2002 ISBN-10: 0-13-009369-6 ISBN-13: 978-0-13-009369-1.*

SyncML Device Management Bootstrap, Version 1.1, Feb. 15, 2002, Copyright © 2002 Ericsson, IBM, Lotus, Matsushita Communications Industrial Co., Ltd.,Motorola, Nokia, Openwave, Palm, Psion, Starfish Software, Symbian, and others., p. 1-18 http://www.syncml.org/docs/syncml_dm_boot_v11_20020215.pdf.*

SyncML Notification Initiated Session Version 1.1 Feb. 15, 2002, Copyright © 2002 Ericsson, IBM, Lotus, Matsushita Communications Industrial Co., Ltd.,Motorola, Nokia, Openwave, Palm, Psion, Starfish Software, Symbian, and others., p. 1-12 http://www.syncml.org/docs/syncml_dm_notification_v11_20020215.pdf.*

SyncML Device Management ProtocolVersion 1.1, Feb. 15, 2002, Copyright © 2002 Ericsson, IBM, Lotus, Matsushita Communications Industrial Co., Ltd.,Motorola, Nokia, Openwave, Palm, Psion, Starfish Software, Symbian, and others., p. 1-18 http://www.syncml.org/docs/syncml_dm_protocol_v11_20020215.pdf.*

Byung-Yun Lee et al., 5th IEEE International Conference on Data synchronization protocol in mobile computing environment using SyncML,High Speed Networks and Multimedia Communications(2002) pp. 133-137 ISBN: 0-7803-7600-5.*

Huni et al, A Framework for Network Protocol Software, ACM (1995).*

* cited by examiner

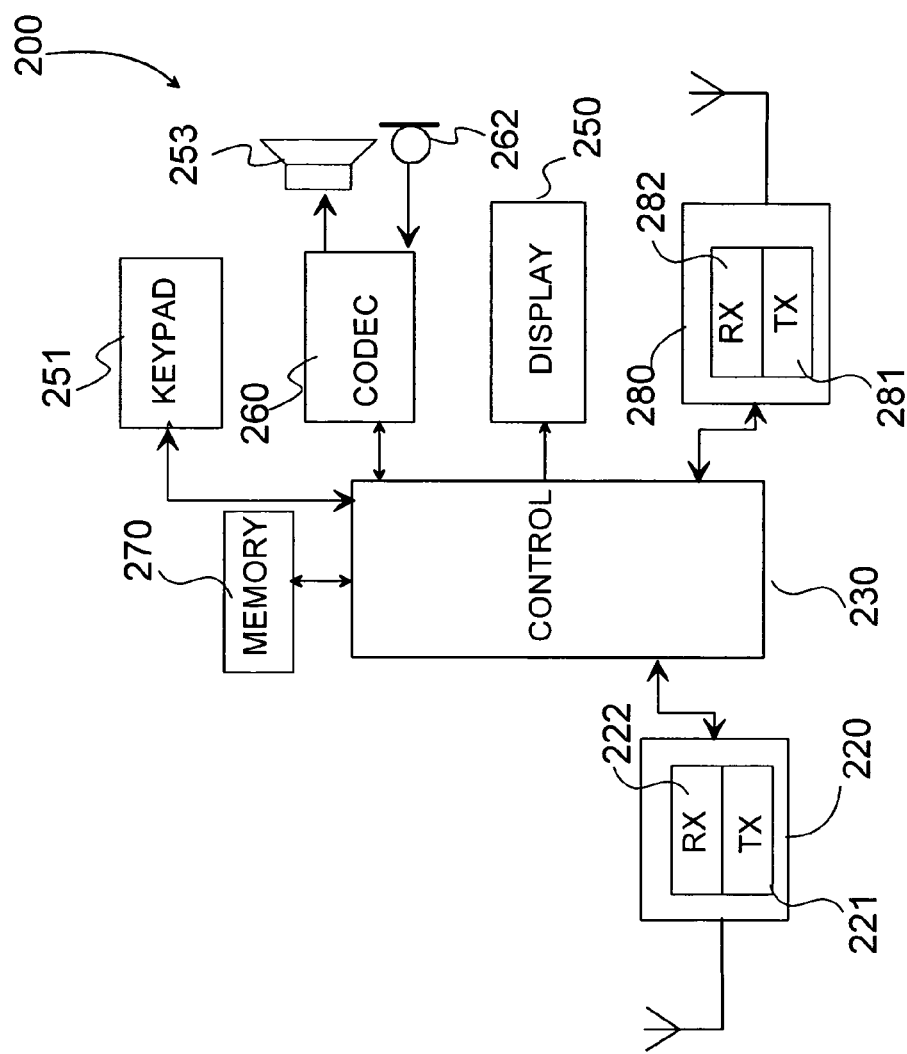

DEVICE MANAGEMENT WITH CONFIGURATION INFORMATION

FIELD OF THE INVENTION

This invention relates to a device management, and particularly to a communication of device management data from a server to a client.

BACKGROUND OF THE INVENTION

Such mobile services as for example browsing, multimedia messaging, mobile e-mail and calendar synchronization can only be used if a mobile phone is configured correctly. The configuration can be done manually by a user, or automatically by downloading the configuration settings. The process of managing device settings and applications is called device management. When receiving the settings the user saves them into the device after which the user is able to use the service.

The device management can be implemented by means of two types of messages. The first message used is aimed for bootstrapping a device management session and the following messages used are for initiating the session. The purpose of the bootstrap message is to change a state for a device. This means that the device is moved from an "unprovisioned" empty state to a "provisioned" state where it can initiate a device management session. The bootstrap process shares a set of configuration information between the device and the network. This configuration information comprises information e.g. about a network access point and a proxy.

There are currently two ways to perform the bootstrapping, customized and server-initiated bootstrap. In customized bootstrap, devices are loaded with device management bootstrap information at manufacture, and in server-initiated bootstrap a device management server sends bootstrap information via a known push mechanism, e.g. WAP Push or OBEX (OBject EXchange). The bootstrap message is transferred to the client device by the server to configure the client for the basic DM/CP (Device Management/Client Provisioning) server settings. The PROVURL parameter (including host and path) of the bootstrap message defines a location of the server. PROVURL should be unique within the device, and does thus identify a separate configuration context. The bootstrapping process needs to be performed only the first time when the DM server needs to establish communication with the DM client. After bootstrapping the bootstrapped parameter is set to "No" in the device, whereby the device cannot be bootstrapped again.

After bootstrapping, the other message, notification message, is used. When the client is bootstrapped, the following sessions are configured by means of a notification message. The DM server informs—by means of the notification message—the DM client to connect and establish the device management session. The notification operation needs to be done each time the server wants the client to establish a management session.

Therefore, when the DM server sends communication to DM client for the first time, the steps are as follows:
 1. Bootstrap message from server to client
 2. Notification message from server to client
 3. DM session information, credentials, device information from client to server Sequence step 2 is optional, if initiation parameters are added to the bootstrap message. This means that for the first time the DM server can send an initiation parameter embedded in the bootstrap message, which tells the client to initiate a DM session after the bootstrapping part is done.

When the DM server sends communication to DM client for the following times after bootstrapping, the steps are as follows:
 1. Notification message from server to client
 2. DM session information, credentials and device information from client to server It can be seen that the whole device management process proceeds via at least two steps, wherein the first steps is for bootstrapping and the second is for initiation.

When e.g. communication configuration is downloaded through a telecommunication network the server usually is aware of whether the device has been bootstrapped or whether the bootstrapping needs to be done. This is possible during one-way communication.

Currently mobile terminals are capable of two-way communication (browsing), where less information is transferred to the corresponding server than in one-way communication. Due to two-way communication the server is not always aware of which terminal is at the other end, and how it is configured. It is also possible that the terminal in question has updated its Firmware, whereby any configuration therein may be lost. Therefore, even if the server identified the terminal in question, it would not know what is the current state of that terminal.

Therefore the server is not able to select which of the two messages is needed at that time. As a result, the server may send a notification message even though a bootstrap message is needed, whereby the DM session fails.

Currently there seems not to be any solution for easing the overall process for the server but also for the client terminal. With existing methods correct information is possible to send, if the server can identify the terminal and identify its configuration. However, that is only possible, if the terminal sends—every time a communication is begun—information about its setting. This, naturally, increases the data transfer between the client and the terminal. For improving user experience when using mobile services and facilitating the device management, all inconvenient tasks should be minimized for the user. As an inconvenient task one can think of the failed device management session, roundtrip messages between client and server and difficult configuration process for the user.

SUMMARY OF THE INVENTION

This invention is addressed to problems described above and proposes a solution, which aims to ease the configuration process by reducing the communication between client and server and by securing that correct information is available for the client every time the client needs such information.

Therefore an object of this invention is to provide a method for device management, wherein a device is at first bootstrapped for a DM session, after which the DM session is initiated in said device, wherein a bootstrapping information is transferred within the same data with an initiation information, wherein after determining a state of said device, one of said informations is selected to be used for the DM session.

Another object of this invention is to provide a system for device management (DM) comprising means for bootstrapping a DM session and initiating said DM session, a server for transferring data containing at least both bootstrapping information and initiation information, said system further comprising means for determining a state of said client, wherein the system is capable of selecting one of said informations for the DM session.

Yet another object of this invention is to provide a server for device management (DM) comprising means for transferring bootstrapping information and initiation information for a DM session, said server being configured to form data containing at least both bootstrapping information and initiation information, and to transfer said data substantially at the same time to a client.

Further another object of this invention is to provide a client for device management (DM) comprising means for receiving bootstrapping information and initiation information for a DM session, wherein at least both of said informations are sent in the same data, wherein said client is capable of determining a state of said client, and wherein the client is further capable of selecting one of said informations for the DM session.

Yet another object of this invention is a computer program product for device management of a client comprising code means stored on a readable medium, adapted, when run on a computer, to receive bootstrapping information and initiation information for a DM session, wherein at least both of said informations are received in the same data, wherein the code means is capable of determining a state of said client and further selecting one of said informations for DM session.

Yet another object of this invention is a message structure for device management, comprising at least a bootstrapping information and an initiation information.

According to this invention both the bootstrapping information and the notification information can be transferred to the client at the same time. This prevents the possibility that correct information needed for device management is not available, whereby additional round trips between client and server may be avoided.

DESCRIPTION OF THE DRAWINGS

A better understanding of the invention may be obtained from the following considerations taken in conjunction with the accompanying drawings and a detailed description of few examples.

FIG. 2 illustrates an example of a client device.

DETAILED DESCRIPTION OF THE INVENTION

Figure 1:
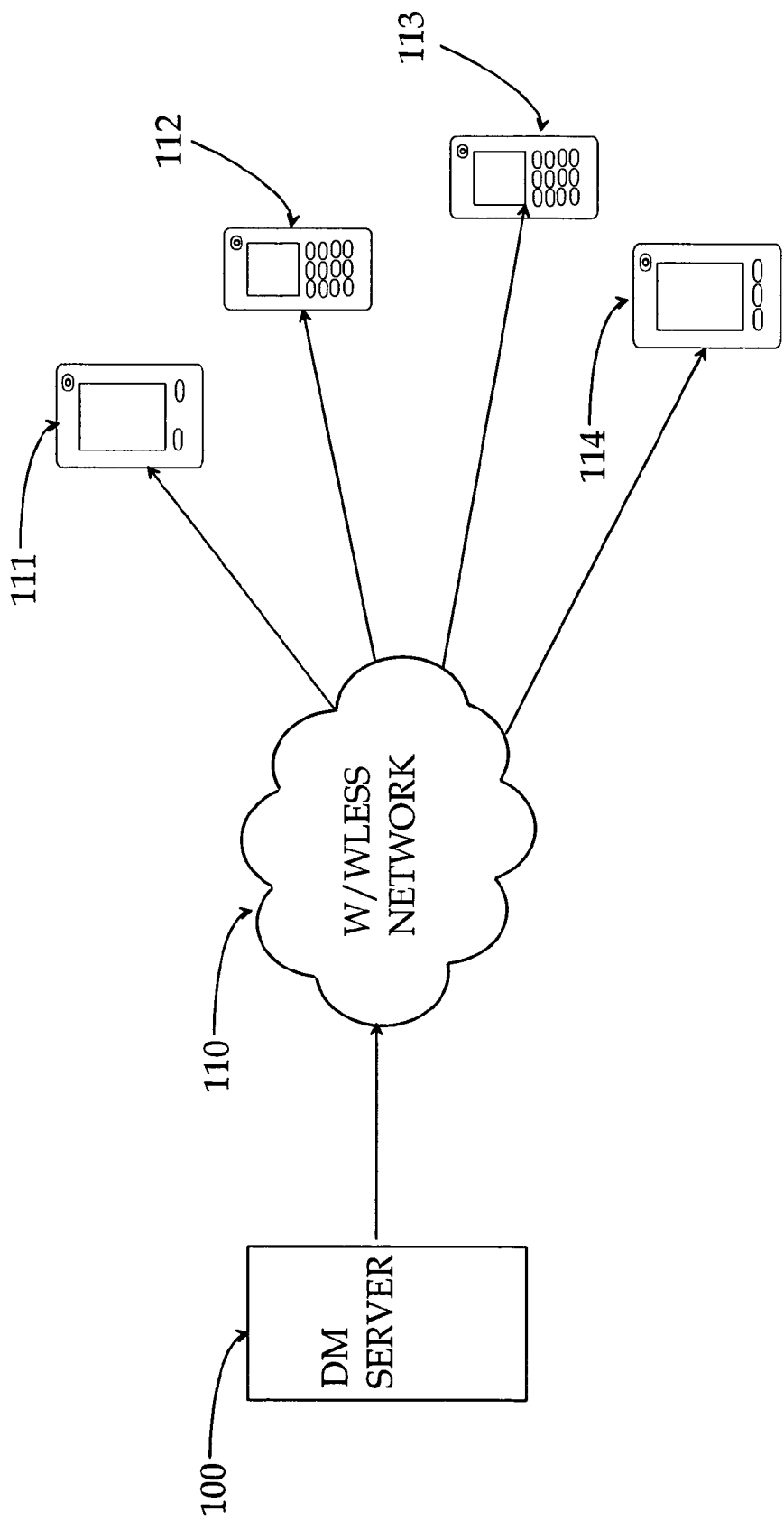
FIG. 1 illustrates an example of a data management system.

This invention is based on an idea that all the information that is needed for device management is transferred from a server to a client device substantially at the same time. This can be implemented by sending both bootstrapping information and initiation information in one message in their own packets, or by containing the bootstrapping information with the initiation information into one packet. In this description, the term "data" is used to refer to both situations. The data can be a message containing a packet pair, one of which contains at least bootstrapping information and the other containing at least the initiation information—or the data can be a packet comprising both of the informations. The data received by the client is analysed in the device and correct information is extracted and used. Initiation information can be a notification message as known from the prior art or information about DM server identification. This idea according to the invention is simpler than solutions of the prior art where two messages at different stages are transferred to the client depending on the state of the client device.

In one example of the invention the data comprises a bootstrap information and device management server identification as initiation information. After receiving such a data, the client can check whether its state is provisioned or not. If the client is in a provisioned state, the client first extracts the device management server identification from the message, deciphers it and uses it. If the client is in an unprovisioned state, the client extracts the bootstrap information and the information contained in it and uses that information for bootstrapping. It will be appreciated that it is also possible—at first—to extract the device management server identification and after that, to check the state. Therefore it also will be appreciated that any order of the previous steps is possible. The main thing is that if the client detects that it is in an unprovisioned state, the device management server identification is discarded and bootstrap information is used. On the other hand if the client is in a provisioned state, the bootstrap information is discarded and the device management server identification is used.

It is possible that when the client detects that it is in an unprovisioned state, the device management server identification is not discarded but the client makes the decision internally to use first the bootstrap information and then use the device management server identification information.

In another example the data comprises bootstrap information and notification information. After receiving such a data, the client can check whether its state is provisioned or not. The notification information is discarded if the client is in an unprovisioned state, wherein the bootstrap is used. On the contrary, when the client is in a provisioned state, the bootstrap information is discarded and the notification is used. Therefore if the client is in an unprovisioned situation the client extracts the bootstrap information and deciphers it. In the provisioned situation the client extracts the notification information and the information contained in it. Naturally, the above-mentioned example of using first the bootstrap information and then the device management server identification information is possible as well.

The following table 1 summarizes the previous examples:

TABLE 1

| Examples of the device management process | | |
|---|---|---|
| State of the device | DM server ID and Bootstrap | Notification and Bootstrap |
| Unprovisioned | Discard DM server ID, Use Bootstrap | Discard Notification, Use Bootstrap |
| Provisioned | Discard Bootstrap, Use DM server ID | Discard Bootstrap, Use Notification |

The client device is capable of discarding the Bootstrap information if same PROVURL, which identifies the configuration context, is used when it is sent. Notification or DM Server ID can be discarded by the client device if the device does not have a corresponding server account.

For the previous examples, it does not matter, how the data is transferred to the client. Whether the information is in two packets contained in one message or in one packet. In both cases, the state of the client is determined according to which one of the informations is used.

An example of a device management system is illustrated in FIG. 1. The system comprises a device management server 100 that provides configuration information. The server 100 operates via wired or wireless network 110 that is used for delivering communication. The configuration information is communicated to one or many client devices 111, 112, 113, 114.

In FIG. 2 an example of a client device is illustrated. The device 200 comprises a communication means 220 having a transmitter 221 and a receiver 222 or the device is connected to such. There can also be other communicating means 280 having a transmitter 281 and a receiver 282 as well. The first communicating means 220 can be adapted for telecommunication and the other communicating means 280 can be a kind of short-range communicating means, such as a Bluetooth™ system, a WLAN system (Wireless Local Area Network) or other system which suits local use and for communicating with another device. The device 200 also comprises a display 240 for displaying visual information, e.g. web pages. In addition the device 400 may comprise an interaction means, such as a keypad 250 for inputting data etc. In addition or instead of the keypad 250, the device can comprise a stylus, when the display is a touch-screen display. The device 200 can also comprise audio means 260, such as an earphone 261 and a microphone 262 and optionally a codec for coding (and decoding, if needed) the audio information. The device 200 also comprises a control unit 230 for controlling functions and running applications in the device 200. The control unit 230 may comprise one or more processors (CPU, DSP). The device further comprises memory 270 for storing e.g. data, applications, computer program code. The method itself can be implemented by a program code that can be stored on a memory of the device.

It will be clear that variations and modifications of the examples of embodiment described are possible without departing from the scope of protection of the invention as set forth in the claims.

What is claimed is:

1. A method for device management, comprising:
   receiving in a client device, bootstrapping information and device management (DM) session initiation information within a same message from a DM server;
   determining by said client device, a client device state; wherein said client device state is selected from the group consisting of provisioned and unprovisioned;
   selecting by said client device one of said bootstrapping information or said DM session initiation information based on the client device state as determined by said client device so as to accordingly
   (i) bootstrap said client device, whereby said client device state is changed from unprovisioned to provisioned, and said client device is operable to initiate a DM session with a DM server indicated in said same message or
   (ii) initiate by said client device a device management session in said device, wherein said device management session includes a DM Server indicated in said same message;
   wherein only bootstrapping information is selected and DM session initiation information is discarded, if said client device state is unprovisioned, and
   wherein only DM session initiation information is selected, and bootstrapping information is discarded if said client device state is provisioned 2. The method of claim 1, wherein said same message comprises the bootstrapping information in its own separate and distinct bootstrapping information packet and the DM session initiation information in its own separate and distinct DM session initiation packet, and wherein the bootstrapping information packet and the DM session initiation packet are received substantially at the same time.

3. The method of claim 1, wherein said same message comprises the bootstrapping information and the DM session initiation information combined in a same packet.

4. A system for device management comprising:
   a client device comprising a control unit operable to bootstrap a device management (DM) session and initiating said device management (DM) session, and
   a server operable to transfer a data single message containing at least both bootstrapping information and DM session initiation information to said client device,
   wherein said control unit of said device is further operable to determine a client device state, wherein said client device state is selected from the group consisting of provisioned and unprovisioned; and
   based on the determined client device state to select one of said bootstrapping information or said DM session initiation information, so as to accordingly
   (i) bootstrap said client device, whereby said client device state is changed from unprovisioned to provisioned, and said client device is operable to initiate a DM session with a DM server indicated in said same message or
   (ii) initiate by said client device a device management session in said client device, wherein said device management session includes a DM Server indicated in said same message;
   wherein only bootstrapping information is selected and DM session initiation information is discarded, if said client device state is unprovisioned;
   wherein only DM session initiation information is selected, and bootstrapping information is discarded if said client device state is provisioned.

5. A device management (DM) server operable to form a singe message containing at least a client device bootstrapping information and a device management (DM) session initiation information, and to transmit said single message to a client device;
   wherein the initiation DM session initiation information includes device management server identification information; and
   wherein the client device state is unknown to said DM server;
   and upon receiving said single message from said DM server said client device selects one of said bootstrapping information or said DM session initiation information
   wherein said selection is based on said client device determining a client device state, and wherein said client device state is selected from the group consisting of provisioned and unprovisioned
   so as to accordingly bootstrap said client device or initiate by said client device a device management session in said client device;
   wherein only bootstrapping information is selected and DM session initiation information is discarded, if said client device state is unprovisioned, and
   wherein only DM session initiation information is selected, and bootstrapping information is discarded if said client device state is provisioned.

6. The server of claim 5, wherein said message comprises the bootstrapping information and the initiation information combined in a same packet, which is transmitted to the client device.

7. The server of claim 5, wherein said DM session initiation information is a notification.

8. An apparatus for device management comprising:
   a receiver operable to receive bootstrapping information and device management (DM) session initiation information, wherein at least both of said bootstrapping information and said device management (DM) session initiation information are received in a same message
   a processor operable to determine a state of said apparatus, wherein said apparatus state is selected from the group consisting of provisioned and unprovisioned and to select one of said bootstrapping information or said device management (DM) session initiation information based on the determined state so as to accordingly (i) bootstrap said apparatus, whereby said apparatus state is changed from unprovisioned to provisioned, and said apparatus is operable to initiate a DM session with a DM server indicated in said same message or (ii) initiate by said apparatus a device management session in said apparatus, wherein said device management session includes a DM Server indicated in said same message;

wherein only bootstrapping information is selected and DM session initiation information is discarded, if said apparatus state is unprovisioned, and wherein only DM session initiation information is selected, and bootstrapping information is discarded if said apparatus state is provisioned.

9. A computer readable storage medium stored with code, which executed by a processor in an apparatus causes said apparatus:

to receive bootstrapping information and device management (DM) session initiation information, wherein at least both of said bootstrapping information and said device management (DM) session initiation information are received in a same message to determine a state of said apparatus wherein the state of said apparatus is selected from the group consisting of provisioned and unprovisioned; and to select one of said bootstrapping information or said device management (DM) session initiation information based on the determined state of the apparatus so as to accordingly (i) bootstrap said apparatus, whereby the state of said apparatus is changed from unprovisioned to provisioned, and said apparatus is operable to initiate a DM session with a DM server indicated in said same message or (ii) initiate by said apparatus a device management session in said apparatus, wherein said device management session includes a DM Server indicated in said same message;

wherein only bootstrapping information is selected and DM session initiation information is discarded, if the state of said apparatus is unprovisioned, and wherein only DM session initiation information is selected, and bootstrapping information is discarded if the state of said apparatus is provisioned.

10. An apparatus comprising:

means for receiving bootstrapping information and device management (DM) session initiation information, wherein at least both of said are received in a same message, means for determining a state of said apparatus wherein said apparatus state is selected from the group consisting of provisioned and unprovisioned and means for selecting one of said bootstrapping information or said device management (DM) session initiation information based on the determined state of said apparatus so as to accordingly (i) bootstrap said apparatus, whereby the state of said apparatus is changed from unprovisioned to provisioned, and said apparatus is operable to initiate a DM session with a DM server indicated in said same message or (ii) initiate by said apparatus device management session in said apparatus, wherein said device management session includes a DM Server indicated in said same message;

wherein only bootstrapping information is selected and DM session initiation information is discarded, if the state of said apparatus is unprovisioned, and wherein only DM session initiation information is selected, and bootstrapping information is discarded if the state of said apparatus is provisioned.

11. The method claim 1, wherein said DM session initiation information is a notification.

* * * * *